A. V. MITCHELL.
WHEEL FOR ARTILLERY CARRIAGES.
APPLICATION FILED APR. 14, 1914.
1,222,232.
Patented Apr. 10, 1917.
3 SHEETS—SHEET 1.
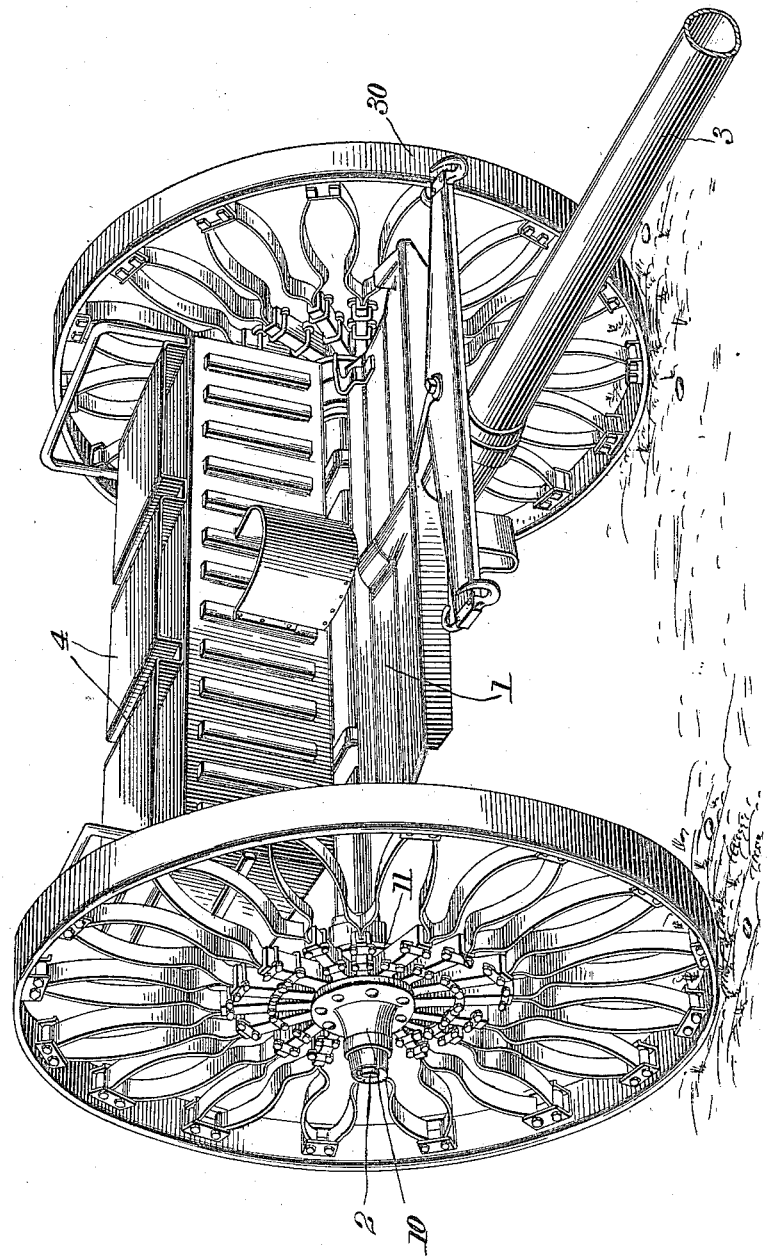

A. V. MITCHELL.
WHEEL FOR ARTILLERY CARRIAGES.
APPLICATION FILED APR. 14, 1914.
1,222,232.
Patented Apr. 10, 1917.
3 SHEETS—SHEET 2.
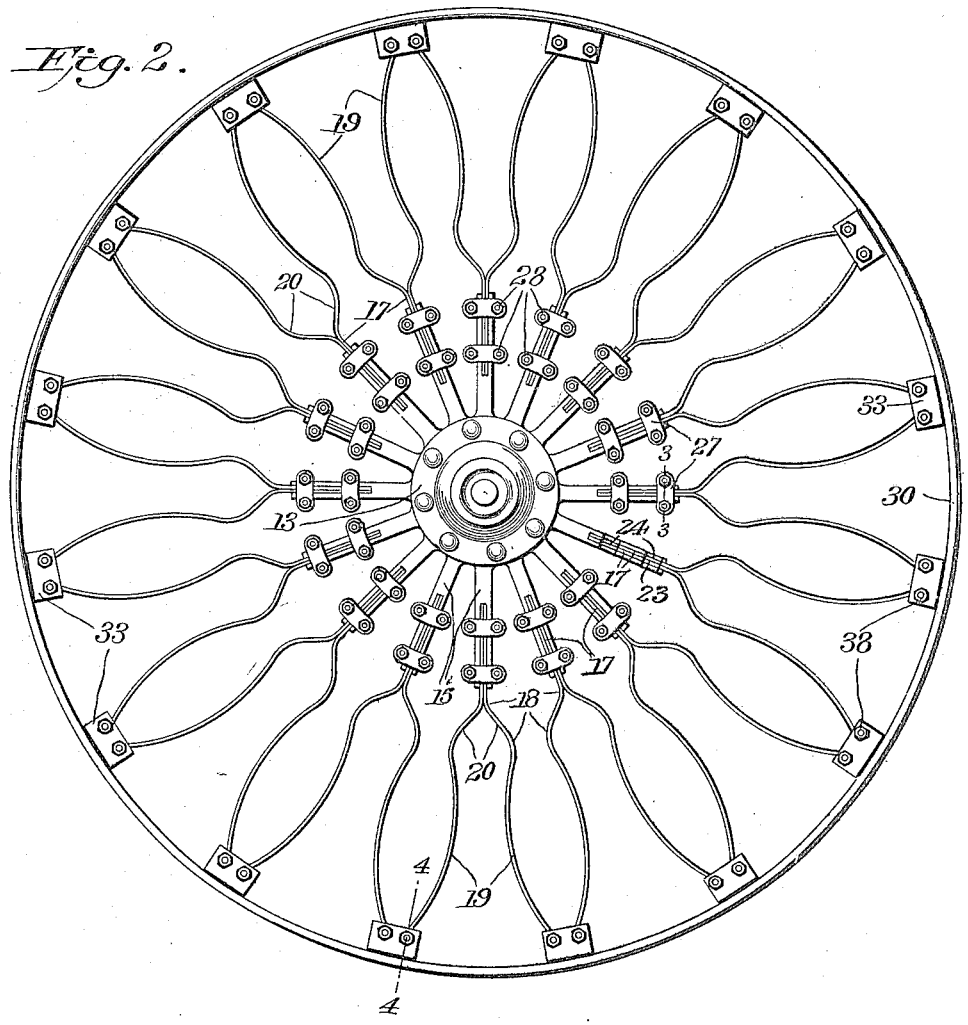
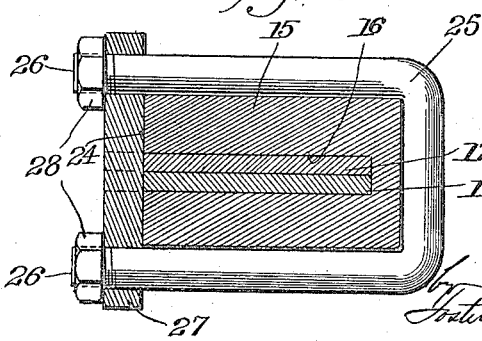

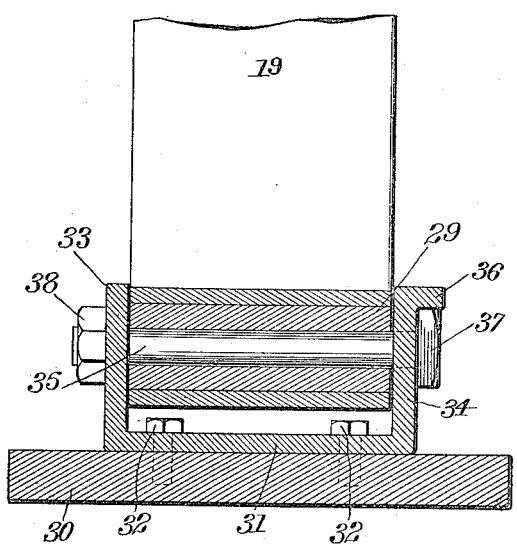
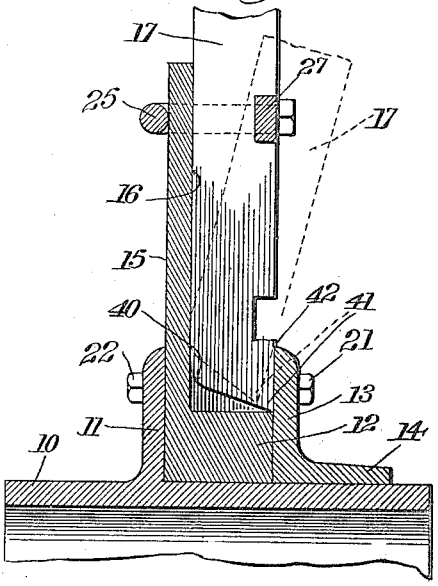
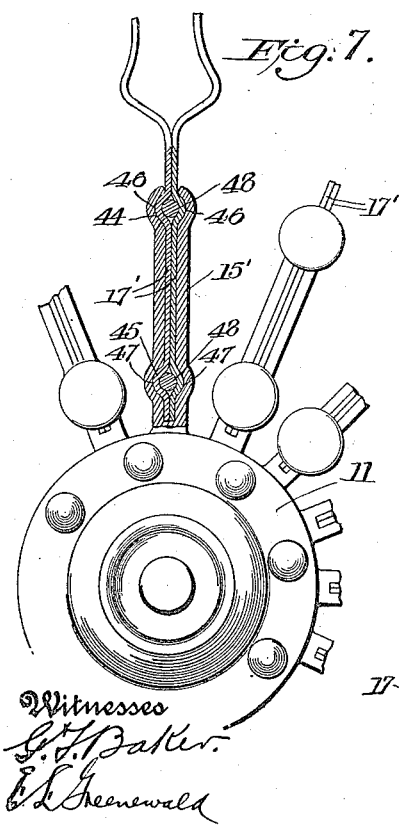
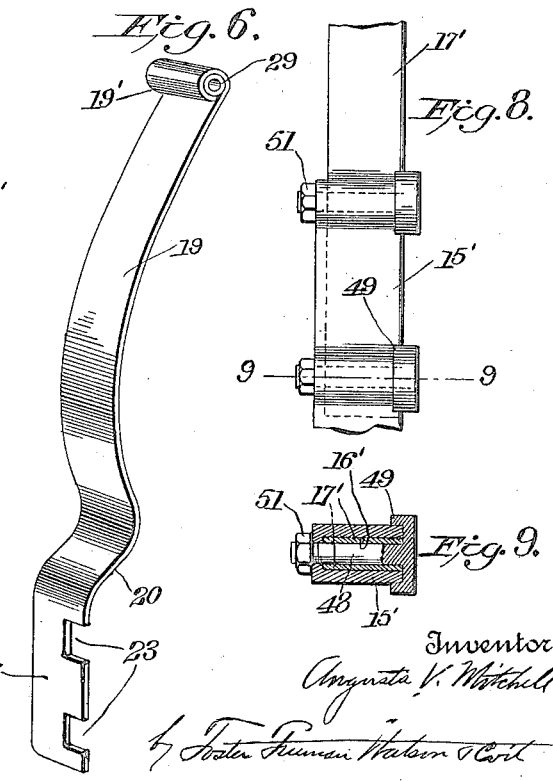

UNITED STATES PATENT OFFICE.

AUGUSTA VIRGINIA MITCHELL, OF WASHINGTON, DISTRICT OF COLUMBIA.

WHEEL FOR ARTILLERY-CARRIAGES.

1,222,232.   Specification of Letters Patent.   Patented Apr. 10, 1917.

Application filed April 14, 1914. Serial No. 831,790.

*To all whom it may concern:*

Be it known that I, AUGUSTA VIRGINIA MITCHELL, a citizen of the United States, residing at Washington, District of Columbia, have invented certain new and useful Improvements in Wheels for Artillery-Carriages, of which the following is a specification.

This invention relates to spring wheels which have been designed especially for gun and ammunition carriages used in the artillery services but which are also adapted for other uses.

It is frequently necessary to transport artillery and other military equipment across rough broken country and a rugged running gear is therefore required on vehicles used for these purposes.

It is one of the objects of this invention to provide a simple, strong and light all-metal wheel and one which has considerable resiliency whereby it will ease the movement of the carriage and relieve the vehicle and its contents of the shocks common in field service.

Another object of the invention is to improve the construction of the spokes and the means for securing the same to the hub and to the rim.

The above and other objects and novel features of the invention will be apparent from the following description taken in connection with the drawing, in which, Figure 1 is a perspective view of an artillery carriage for ammunition provided with wheels embodying this invention;

Fig. 2 is a side elevation of a wheel embodying the invention;

Fig. 3 is an enlarged transverse cross section taken on the line 3—3 of Fig. 2;

Fig. 4 is an enlarged transverse section taken on the line 4—4 of Fig. 2;

Fig. 5 is an enlarged detail view of a modified form of fastening means for the spokes in a wheel embodying the invention;

Fig. 6 is a perspective view of one of the spring spokes embodying the invention;

Fig. 7 is a view partly in section and partly in elevation disclosing a portion of a modified form of wheel embodying the invention;

Fig. 8 is a side elevation of a portion of a spoke and the means shown in Fig. 7 for connecting it to the hub; and Fig. 9 is a cross sectional view taken on the line 9—9 of Fig. 8.

Referring to the drawings, 1 designates a suitable metal frame or body which is mounted upon the axle 2. To the frame is attached the tongue 3 to which the draft animals are hitched. The body 1 is arranged to support the ammunition chests 4 above the axle and at the rear of the frame there is a suitable means (not shown) for attaching the gun carriage which may also be equipped with wheels constructed according to this invention.

Each wheel comprises a hub 10 for supporting the axle 2, and each hub has an integral flange 11. A spider having a hub 12 provided with a bore of sufficient diameter to fit on the outside of the hub 10 is held in place against the integral flange 11 by means of a removable flange 13 which has an annular part 14 providing bearing surface for the same on the outer surface of the hub 10. The spider has a series of radially extending integral arms 15, each of which is provided with a slot 16 along its outer face producing a U-shaped arm, as shown in section in Fig. 3. The slot 16 extends from the outer end inwardly and may terminate intermediate the ends of the arm, as shown in Fig. 2, or may extend all the way to the hub portion 12 of the spider, as shown in Figs. 7 and 8. The slots 16 shown in Figs. 2, 3 and 5 are of such a width as to receive the inner ends of the two straight portions 17, 17 of a pair of spokes.

Headed bolts 21 extend through the clamping flanges 13 and 11 and through the hub 12 of the spider and are fitted with nuts 22 at their ends to hold the parts together.

Referring to Figs. 2 and 6, the spokes are made of flat resilient bands set with the flat face parallel to the axle of the vehicle. Each spoke comprises a straight radially extending portion 17 and a bowed portion 19 connected by a reversely curved part 18, 20, the curved parts 18 joining the straight part 17 to the intermediate part 20 being gradual so that the spoke will have no sharp bends to weaken it. Each of the straight portions 17 is provided with notches 23 along one of its edges. The notched portions of a pair of straight portions 17 are placed in register and when fitted in the slot 16 in the outer face of an arm 15 of the spider they register with corresponding notches 24 in the faces of the arm. To lock the inner ends of the spokes in place, a U-shaped bar or clamp 25 is provided which fits around the outside of the arm 15 and has threaded ends 26, 26. A plate 27 which has openings at its ends to fit over the threaded ends 26 of the bar 25 is of a width to fit the notches in the inner ends of the spokes and in the arm 15 and is held in place by nuts 28, 28, which screw onto the threaded ends 26, 26 of the bar, thus locking the ends of the spokes in the slots and against lateral or longitudinal movement.

The outer ends of the spokes are curled upon themselves as at 19' and are wrapped tightly around a brass bushing 29 to hold the same. The bushing, being of softer material than the spoke or the means for securing it to the tire 30, will take the wear and may be renewed when desired. The U-shaped plate shown in Figs. 2 and 4 is provided for securing the spring spokes to the metal tire or rim 30. The bottom part 31 of the U-shaped plate is fastened to the inner face of the tire 30 by means of the screws 32 which extend into the tire. The outer end of the spoke is journaled between the parallel, inwardly extending parts 33 and 34 of the U-shaped plate, a bolt 35 extending through the sleeve 29 and through the parallel members 33 and 34 and providing the pivotal support on which the brass sleeve 29 in the outer end of the spoke bears. In order to prevent the rotation of the bolt 35 as the spring spoke is flexed, an outwardly extending projection 36 is provided at the inner edge and integral with the member 34 of the supporting plate. The projection 36 engages one of the flat faces of the angular head 37 of the bolt 35. The bolt 35 is secured in place by a nut 38 which engages the threaded end thereof on the outside of the part 33 of the U-shaped supporting plate. By mounting the end of the spoke at the rim in this manner, the bolt 35 is held against turning so as to prevent the same from wearing the bolt holes in the parallel members 33 and 34 and to cause the bushing 29 to take the wear. The spokes are then less apt to become loose and rattle at their outer ends.

The parallel parts 33 and 34 of the fastening plates on the rim are arranged parallel to the flanges 11 and 13. Furthermore, it will be seen that the U-shaped plates secure the outer ends of the spring spokes in pairs to the inner side of the metal rim or tire. The adjacent spokes of successive pairs secured at their outer ends have the straight portions 17 of their inner ends fitted in the slots in the radial arms 15 of the spider and are clamped thereto in pairs. Only the straight portions 17 of the spokes extend radially, the curved parts extending at an angle to the radial lines.

In Fig. 5 a construction is shown which provides for the easy insertion of the spoke at its hub end. In this construction, which may be embodied in the other wheels shown in the drawings, the straight or inner end 17 of the spoke is provided with a rounded corner 40 and a sharp or square corner 41. The two flanges 11 and 13 being in place and bolted together by bolts 21 and having secured between them the hub 12, a spoke may be inserted in the manner shown in dotted lines in Fig. 5. The end 41 is extended into the slot 16 of the radial arm 15 and then, by using the edge 42 of the flange 13 as a fulcrum, the spoke may be operated as a lever and forced or pried into place, the rounded corner 40 providing a suitable curved portion to permit the end of the spoke to easily pass the bottom of the slot. The ends of the spokes fit tight at the inner end of the slot between the two flanges 11 and 13 and may be held in place by clamping devices, in the manner shown in Fig. 3. The spokes may also be withdrawn in the reverse manner without removing the flange 13.

In the construction shown in Figs. 7, 8 and 9, the inner straight ends 17' of the spring spokes are provided with bends 44 and 45 which fit in curved recesses 46 and 47 in the arms 15', which are otherwise similar in construction to the arms 15 heretofore described. The two inner straight ends 17', 17' of the spokes in this construction are bent instead of slotted and when placed in complementary relation in the recesses 46 and 47, as shown in Fig. 7, the bent portions providing holes to receive the shanks of the bolts 48, 48 which extend therethrough and lock both spokes in place. The bolts 48 are each provided with a head having flanges 49 that bear against opposite faces of the curved part in the arms 15' to lock the bolts against turning and to also prevent the spreading of the spoke retaining slot 16'. The bolts constitute clamping means to retain the inner ends of the spokes in place in the slots in the arms 15' and are threaded to receive nuts 51 which hold them in place.

It will be observed that in the construction above described a wheel is produced in which the hub construction is provided with rigid radial spider arms extending out toward the rim but terminating short of the rim. The spider arms thus constitute parts of the spokes, the balance of the spokes being made up of the spring members made from flat strips of resilient metal such as steel. The spring metal parts have straight ends fitting in the radial recesses or grooves in the spider arms being of the same width as the depth of the groove and are securely and rigidly clamped therein at different points longitudinally of the spider arms thus making a very strong construction. Each groove receives the ends of two adjacent spokes and these spokes are outwardly bowed from each other from the end of the spider arm to the rim but adjacent the ends of the spider arms have reverse bends without any sharp angles. The spokes from adjacent spider arms come practically together at the rim at a point approximately midway between adjacent spider arms. This construction makes the wheels strong and rigid, capable of supporting the heavy artillery carriages, and successfully resisting all of the strains to which they are subjected in actual use. The wheels, however, have sufficiently yielding capacity due to the resiliency of the spokes to take up the shock of sudden impact, thus preventing breakage either of the wheels or other parts.

While the wheel has been shown and described in detail, it is not intended to limit the invention to the exact construction as set forth, as it is clear that numerous changes may be made without departing from the spirit of the invention.

Having thus described the invention what is claimed and desired to be secured by Letters Patent is:

1. In a wheel of the class described, the combination of a rim, a hub, a member having arms provided with spoke receiving recesses and notches at the edges of said recesses, clamping flanges mounted on the hub and securing said member thereto, spring spokes having their outer ends secured to said rim, and their inner ends fitting said recesses and provided with notches which correspond to the notches in said arms, and means for retaining said spokes in the recesses comprising devices which extend transversely of the arms across the recesses and the spokes therein, said devices fitting in the notches in said arms and spokes and locking the latter to the hub.

2. In a wheel of the class described, the combination with a hub construction having radial recesses therein in the form of grooves open at one side and end only, and notches at the open sides of said recesses, of flat spring metal spokes fitting tightly within said recesses and having notches along the edge thereof adjacent the open side of said recesses registering with the notches in the hub, and means for retaining the spokes in place comprising a member fitting the notches in the hub and the notches in the edges of the spokes and a device connected to the ends of the member and passing around the grooved portion of the hub and the spokes therein.

3. In a wheel of the class described, the combination with a hub provided with radial arms having recesses therein in the form of grooves open at the side, of flat spring metal spokes having parts at their inner ends fitting tightly within said recesses and adapted to be inserted from the side of the hub, each of said arms on the hub having a plurality of notches therein and each spoke having a corresponding number of notches registering with the notches in the arms, and devices coöperating with the notched portions of the spokes and arms to lock the spokes to the hub.

4. In a wheel of the class described, the combination with a hub construction having radial recesses therein in the form of grooves terminating at their inner ends in sockets, of flat spring metal spokes fitting in said grooves and extending into and fitting tightly within said sockets the inner ends of said spokes being cut away on a curve on the side fitting in the bottom of said grooves, and means for rigidly securing said spokes in said grooves near the outer ends of said grooves.

5. In a wheel of the class described, the combination with a hub, of securing flanges on said hub, and spokes fitting between said flanges, the end of each spoke having a flat portion provided with a curved edge at its inner end.

6. In a wheel of the class described, the combination of a hub, a spider mounted on said hub and having spoke receiving recesses, flanges on said hub for holding the spider in place and extending across the recesses in the spider, flat spring spokes fitting said recesses, each of the spokes having a rounded edge at its end whereby it may be inserted in the recess from the side and forced into the part of the recess which the flange overlaps.

7. In a wheel of the class described, the combination of a hub, a rim, spring spokes secured to the hub at their inner ends, and means for securing the outer ends of the spokes to the rim comprising U-shaped plates secured to the inner side of the rim and having bolt holes in the parallel parts thereof, said plates also having projections thereon, bolts fitting said bolt holes and having heads engaging the projections on said plates to prevent the turning of said bolts, and bearing bushings fitting the portions of said bolts located between said parallel parts of the U-shaped plates, said spokes having the outer ends thereof bent around said bushings.

8. In a wheel of the class described, the combination with a hub construction having radial recesses therein in the form of grooves open at one side thereof only and terminating at their inner ends in sockets, of flat spring metal spokes fitting into said grooves from the side and extending into and fitting tightly within said sockets, and devices passing around the recesses to secure the spokes in the grooves.

9. In a wheel of the class described, the combination of a hub, a rim, spring spokes secured to the hub at their inner ends, and means for securing the outer ends of the spokes to the rim comprising U-shaped plates having pivotal fastening means mounted in the parallel parts thereof, the outer ends of said spokes being connected with said pivotal fastening means, part of said pivotal means being stationary and part being rotatably mounted on said stationary part.

10. In a wheel of the class described, the combination of a hub, a rim, spring spokes secured to the hub at their inner ends, and means for securing the outer ends of the spokes to the rim comprising U-shaped plates secured to the inner side of the rim and having bolt holes in the parallel parts thereof, bolts fitting said bolt holes, means for preventing the turning of said bolts, and bearing bushings fitting the portions of said bolts located between said parallel parts of the U-shaped plates, said spokes having the outer ends thereof bent around said bushings.

11. In a wheel for the purposes described, the combination of a hub, a spider having radiating arms with spoke receiving slots open along one face of the arms, said arms having notches at the open portions of said slots, clamping flanges for securing the spider to the hub, spring spokes having straight inner ends notched along one edge, the notches in the spokes being designed to be placed in register with the notches in the arms, and means for clamping the spokes in place in said slots comprising devices embracing the arms and having parts which extend across the slots and fit the notches in the arms and spokes.

12. In a wheel of the class described, the combination with a rim, of a hub construction having radial spider arms, the said arms provided with radial recesses or grooves, curved resilient metal spokes having straight ends fitting in said recesses, said recesses being open at one side of the wheel only whereby the straight ends of said spokes may be inserted from that side of the wheel and whereby they will be inclosed at the sides and at the rear edge, means for securing said ends in said recesses, and means for securing the opposite ends of said spokes to the rim.

13. In a wheel of the class described, the combination with a rim, of a hub construction having radial spider arms, the said arms provided with radial recesses or grooves, resilient metal spokes having straight ends fitting in said recesses and extending from the ends of said spider arms to a point on the rim radially approximately midway between adjacent spider arms, each spoke having a reverse bend without sharp angles adjacent the ends of the spider arms, means for securing said spokes in said grooves, and means for securing the opposite ends of said spokes to the rim.

14. In a wheel of the class described, the combination with a rim, of a hub construction having radial spider arms, the said arms provided with radial recesses or grooves, resilient metal spokes having straight ends fitting tightly in said recesses in pairs, the spokes of each pair being bowed outward from each other to points on the rim, each spoke having a short reverse bend without sharp angles adjacent the end of the spider arm, means for securing said spokes in said recesses, and means for securing the opposite ends of the spokes to the rim.

15. In a wheel of the class described, the combination with a rim, of a hub construction having radial spider arms, the said arms provided with radial recesses or grooves, resilient metal spokes having straight ends fitting tightly in said recesses in pairs, the spokes of each pair being bowed outward from each other to points on the rim, each spoke having a short reverse bend without sharp angles adjacent the end of the spider arm, means for securing said spokes in said recesses, a U-shaped plate secured to the inner side of the rim midway between adjacent spider arms, and means for pivotally securing the outer ends of a pair of spokes from adjacent spider arms to said U-shaped plate.

In testimony whereof I affix my signature in presence of two witnesses.

AUGUSTA VIRGINIA MITCHELL.

Witnesses:
FRANK P. MITCHELL,
ARTHUR L. BRYANT.